US011236958B2

(12) United States Patent
Lyle et al.

(10) Patent No.: US 11,236,958 B2
(45) Date of Patent: Feb. 1, 2022

(54) TUBE CLEANING GUN WITH SELF-SEALING NOZZLE

(71) Applicant: Projectile Tube Cleaning, Inc., Ford City, PA (US)

(72) Inventors: Evan Lyle, Ford City, PA (US); Daniel Lyle, Kittanning, PA (US)

(73) Assignee: Projectile Tube Cleaning, Inc., Ford City, PA (US)

( * ) Notice: Subject to any disclaimer, the term of this patent is extended or adjusted under 35 U.S.C. 154(b) by 193 days.

(21) Appl. No.: 15/907,521

(22) Filed: Feb. 28, 2018

(65) Prior Publication Data
US 2019/0264994 A1    Aug. 29, 2019

(51) Int. Cl.
*F28G 1/12* (2006.01)
*F16L 37/62* (2006.01)
*F28G 15/02* (2006.01)
*B08B 9/032* (2006.01)
*F16L 55/38* (2006.01)
*F16L 101/12* (2006.01)

(52) U.S. Cl.
CPC ............... *F28G 1/12* (2013.01); *B08B 9/0323* (2013.01); *F16L 37/62* (2013.01); *F16L 55/38* (2013.01); *F28G 15/02* (2013.01); *F16L 2101/12* (2013.01)

(58) Field of Classification Search
None
See application file for complete search history.

(56) References Cited

U.S. PATENT DOCUMENTS

| 1,547,440 | A | | 7/1925 | Penn | |
|---|---|---|---|---|---|
| 1,594,575 | A | * | 8/1926 | Stebel | F28G 15/02 212/71 |
| 1,806,270 | A | * | 5/1931 | Thompson | F28G 1/12 15/3.5 |
| 3,531,813 | A | | 10/1970 | Hurst | |
| 3,903,912 | A | | 9/1975 | Ice, Jr. et al. | |

(Continued)

*Primary Examiner* — Daphne M Barry
(74) *Attorney, Agent, or Firm* — The Webb Law Firm (57) ABSTRACT

A system is disclosed for cleaning the interiors of tubes in heat exchangers such as condensers and other devices having numerous substantially parallel tubes which periodically become fouled, scaled, or otherwise encumbered with deposits. An air-actuated seal resides on the end of a nozzle which is projected into the open end of a condenser tube or other heat exchanger tube to be cleaned. An air cylinder and piston retract the end of the nozzle on actuation of a single trigger valve on a manually operated water gun, which both begins high pressure water flow and operates the piston. On actuation of the trigger valve, the segment of the nozzle which has been inserted is retracted a short distance, crimping a flexible sleeve which surrounds it into a tight seal on the inner surface of the tube, thus preventing backflow or back spray. The system may employ projectiles designed to pass through the tubes under pressurized water, released by the gun, in close proximity to the interior surfaces of the tubes so that they may remove the deposits with a scraping or abrading action. The air-actuated sealing nozzle relieves the operator from arduous, repeated forcing of the nozzle into the tubes to maintain sealing contact with the interiors of the tubes. The system is readily adaptable to, and includes, a multi-nozzle arrangement actuated by a single trigger.

7 Claims, 7 Drawing Sheets

(56) References Cited

U.S. PATENT DOCUMENTS

| | | | | |
|---|---|---|---|---|
| 4,429,428 A * | 2/1984 | Van Dyk | ............ | F28G 15/00 |
| | | | | 15/104.062 |
| 4,467,488 A * | 8/1984 | Creek | ............ | F41B 11/87 |
| | | | | 15/104.062 |
| 4,556,102 A | 12/1985 | Bochinski et al. | | |
| 4,605,028 A * | 8/1986 | Paseman | ............ | B08B 9/0433 |
| | | | | 134/167 C |
| 4,724,007 A * | 2/1988 | Barry | ............ | F28G 1/12 |
| | | | | 134/1 |
| 5,010,908 A * | 4/1991 | McLeod | ............ | B08B 9/0433 |
| | | | | 134/168 C |
| 5,022,463 A | 6/1991 | Boisture | | |
| 5,154,198 A * | 10/1992 | Allen | ............ | F28G 1/163 |
| | | | | 134/167 C |
| 5,305,488 A | 4/1994 | Lyle | | |
| 5,448,795 A * | 9/1995 | Boughal | ............ | B08B 9/0322 |
| | | | | 134/113 |
| 5,674,323 A * | 10/1997 | Garcia | ............ | B08B 3/12 |
| | | | | 134/1 |
| 7,306,001 B1 * | 12/2007 | Garcia, Jr. | ............ | B08B 9/0321 |
| | | | | 134/167 C |
| 7,421,757 B1 * | 9/2008 | Garcia, Jr. | ............ | B05B 1/083 |
| | | | | 15/304 |
| 7,454,812 B1 | 11/2008 | Lyle | | |
| 8,146,193 B1 | 4/2012 | Franzino et al. | | |
| 2004/0035445 A1 | 2/2004 | Saxon et al. | | |
| 2004/0099111 A1 | 5/2004 | Adkins | | |
| 2006/0037169 A1 | 2/2006 | Sanders | | |
| 2011/0030734 A1 | 2/2011 | Marschall | | |
| 2012/0055520 A1 | 3/2012 | Gardner et al. | | |
| 2012/0061595 A1 | 3/2012 | Canjuga | | |
| 2012/0067370 A1 * | 3/2012 | Crock | ............ | B08B 9/043 |
| | | | | 134/6 |
| 2012/0175078 A1 * | 7/2012 | Saxon | ............ | F28G 1/06 |
| | | | | 165/95 |
| 2015/0068563 A1 * | 3/2015 | Gzym | ............ | F28G 15/04 |
| | | | | 134/168 C |
| 2019/0049198 A1 * | 2/2019 | Lyle | ............ | F28G 1/163 |

* cited by examiner

TUBE CLEANING GUN WITH SELF-SEALING NOZZLE

TECHNICAL FIELD

A system is disclosed for cleaning the interiors of tubes in heat exchangers such as condensers and other devices having numerous substantially parallel tubes which periodically become fouled, scaled, or otherwise encumbered with deposits. A gun has a trigger which actuates both air and water valves. The system employs projectiles designed to pass through the tubes under pressurized water, released by the gun, in close proximity to the interior surfaces of the tubes so that they may remove the deposits with a scraping or abrading action. An air-actuated sealing nozzle relieves the operator from arduous, repeated forcing of the nozzle into the tubes to maintain sealing contact with the interiors of the tubes. The pneumatic system is readily adaptable to a multi-nozzle arrangement actuated by a single trigger.

BACKGROUND OF THE INVENTION

Scale, encrustations, sludge, oxides, and other deposits have virtually always plagued operators of multi-tube heat exchangers and other devices comprised of numerous tubes. The deposits impede the flow of liquids and gases inside the tubes and impair the heat transfer abilities of the tube walls. Many varieties of devices and methods have been proposed for cleaning them. Simple flushing with various solutions is hardly ever sufficient to remove adherent obstacles to the flow of fluids through the tubes, much less calciferous scale, for example, which in even lesser thicknesses can reduce heat transfer abilities significantly. Spheres of various kinds have been used, but provide only minimal contact with the interior surface of the tube. Some systems employ very high pressure (10,000 psi, for example) water, typically delivered through the end of a lance, to "power spray" the internal surfaces. This requires a long attachment and the ability to manipulate it, often with a failure-prone reciprocating mechanism; moreover, the high pressures present unnecessary dangers to the workmen.

A projectile designed specifically for cleaning tube interiors, such as the projectile described by Daniel C. Lyle in U.S. Pat. No. 5,305,488, has proved to be very successful. The design of the projectile includes a cylindrical body and at least two spaced cutters, each having a plurality of cutting blades extending radially from the cutters. Each cutter has a flexible bushing which permits adjustment of the force exerted by the cutter blades. The projectile is sent through the tube with water, generally under pressures of 200-800 psi., much lower than some other systems. One pass-through is virtually always sufficient. The projectiles are collected at the distal ends of the tubes and may be used again many times. They are versatile in that the cutters and scrapers can be of different diameters for use in different size tubes.

A typical heat exchanger or condenser encountered by the cleaning crew may contain from 100 or fewer to 100,000 tubes in an ordered, equally spaced array terminating on a planar face, all of them ready for cleaning. In a condenser, access to the ends of the tubes is typically gained from the water box, which requires entering through a manhole. The parts of the cleaning equipment that are to be maneuvered by the operators must also pass through the manhole. A heat exchanger may have an enclosure with removable end portions so that the open ends of the tubes are exposed. In either case, the crew will manually insert projectiles at the entrances of a selected number of tubes, perhaps ten percent of them, and then begin the process of propelling them through. This means affixing a specialized "water gun" to the tube openings, usually one at a time, and activating a valve integral to the water gun to allow pressurized water to propel the projectiles through their respective tubes. More than one gun typically is operated by different members of the crew; other members are positioned to collect the projectiles at the distal ends of the tubes. The valve is activated by a trigger on the gun; the gun with the integral valve is maneuverable, being connected to a hose, but is somewhat awkward, and the operators must repeat the placement and triggering of the gun many times to complete a job.

While the projectile system works well, its implementation, particularly the repeated process of affixing the gun to a tube, triggering the gun, assuring that the projectile passes through the tube, and connecting the gun to the next tube, is laborious and time-consuming. Because the seal is often imperfect, cup-shaped splash guards are normally provided around the nozzles, contributing to the awkwardness of the device. A particular aspect of difficulty addressed by the present invention is the need to press or thrust the conventional somewhat tapered nozzle into the tube ends to maintain a good seal. Without a good seal between the nozzle and the interior of the tube, water will escape forcefully in the general direction of the operators, pressure will be reduced within the tube, and energy wasted, often resulting in a less efficient cleaning job and unnecessarily extending the time spent on a given tube. Repeatedly jamming the nozzles into the tubes and rigidly maintaining a decent seal is tiring and often requires suspension of the work while particular members of the crew take a needed rest.

A more efficient, less time-consuming method of maintaining a good seal while cleaning tubes is needed.

SUMMARY OF THE INVENTION

Our invention significantly reduces the manual exertion required to introduce the nozzle of a pressurized water gun into one or more condenser tubes (or other tubes requiring cleaning) and to maintain a good seal while a projectile is propelled by high pressure water through the tube. The invention is readily adaptable for use in a multi-nozzle gun, thus greatly increasing the efficiency of the tube cleaning process.

The invention includes a water gun having a tubular nozzle for directing pressurized water into a condenser tube or other heat exchanger tube to be cleaned. The tubular nozzle has a terminal rim to retain a flexible sleeve. The tubular nozzle together with the flexible sleeve has an external diameter designed to fit within a tube to be cleaned, and is connected to a piston for partially retracting the nozzle after insertion into the tube to compress the flexible sleeve lengthwise and form a tight seal between the nozzle and the tube. The gun is versatile in the sense that it may be used for types of tube cleaning other than projectile cleaning; any system needing a good seal between the gun's nozzle and the tube interior will benefit from the invention.

The purpose of the water gun is to release high pressure water into a tube to be cleaned, typically by propelling a projectile through the tube. Accordingly, the gun is connected to a source of high pressure water, and the gun of the invention may include a trigger that simultaneously activates both a valve to release the water and a cylinder to partially retract the nozzle to compress the flexible sleeve. The trigger may be a manually operated air valve able to provide compressed air to an air-operated valve for the water and to activate a cylinder for moving the piston to retract the nozzle while the gun is inserted in the open end of the tube.

The invention may therefore include a system for cleaning heat exchanger tubes comprising (a) a water gun having a tubular nozzle surrounded by a flexible sleeve, (b) an air-actuated valve for introducing high pressure water to the gun and into a tube, (c) an air-actuated piston for retracting the tubular nozzle, thereby compressing the flexible sleeve to form a tight seal within the tube, and (d) a trigger mounted on the gun to actuate the water valve and the nozzle-retracting piston.

Our invention significantly reduces the exertion required to maintain a seal between a nozzle and a tube, and accordingly it makes it feasible to combine two or more suitably spaced nozzles to be operated simultaneously. That is, the invention includes a system for inserting two or more guns at once and cleaning the respective tubes at the same time.

Our invention includes methods of cleaning tubes using the above described equipment and is more particularly described in the following paragraphs and in the accompanying drawings.

DETAILED DESCRIPTION OF THE INVENTION

Figure 1:
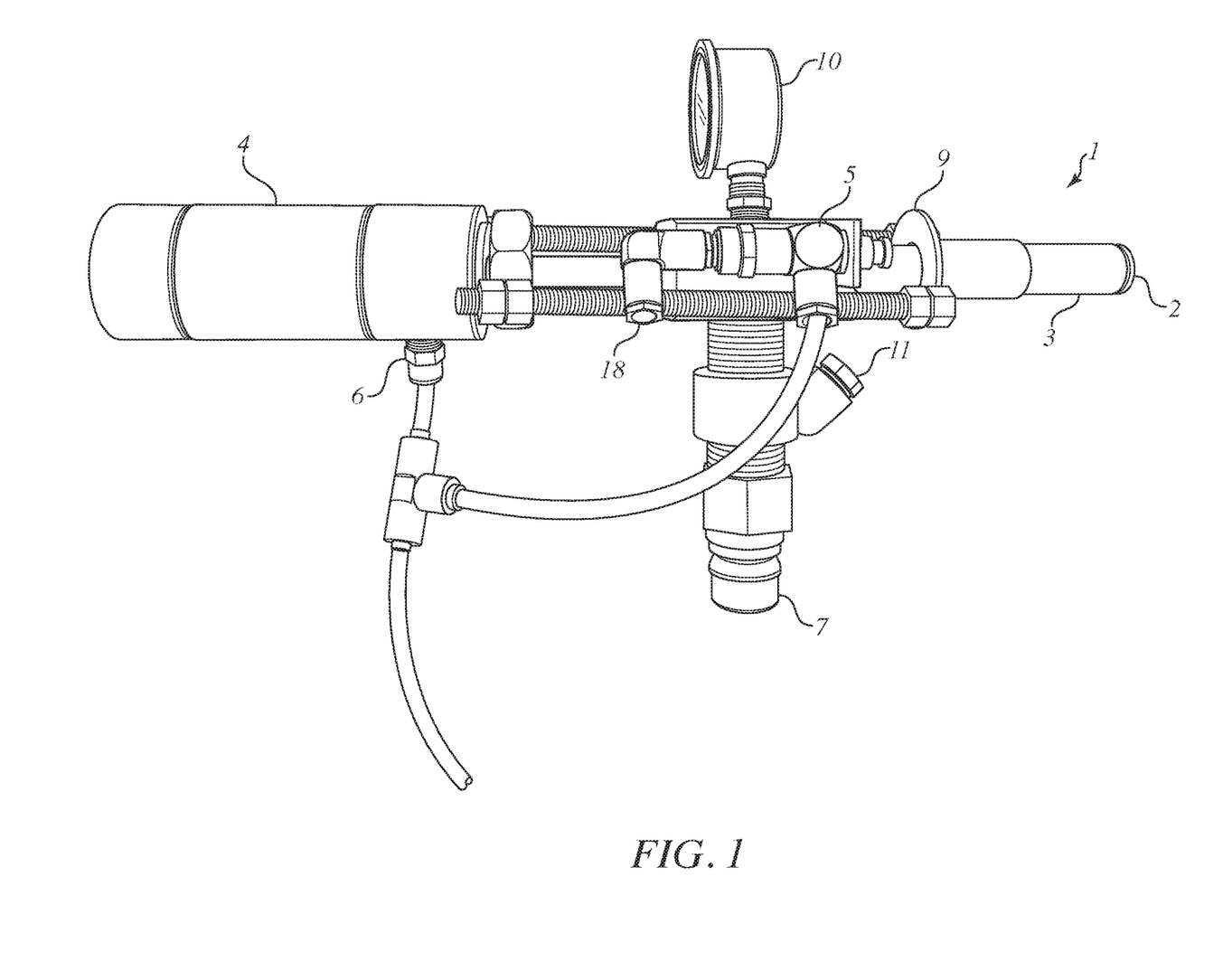
FIG. 1 is a side view of a single water gun of the invention.
Figure 5:
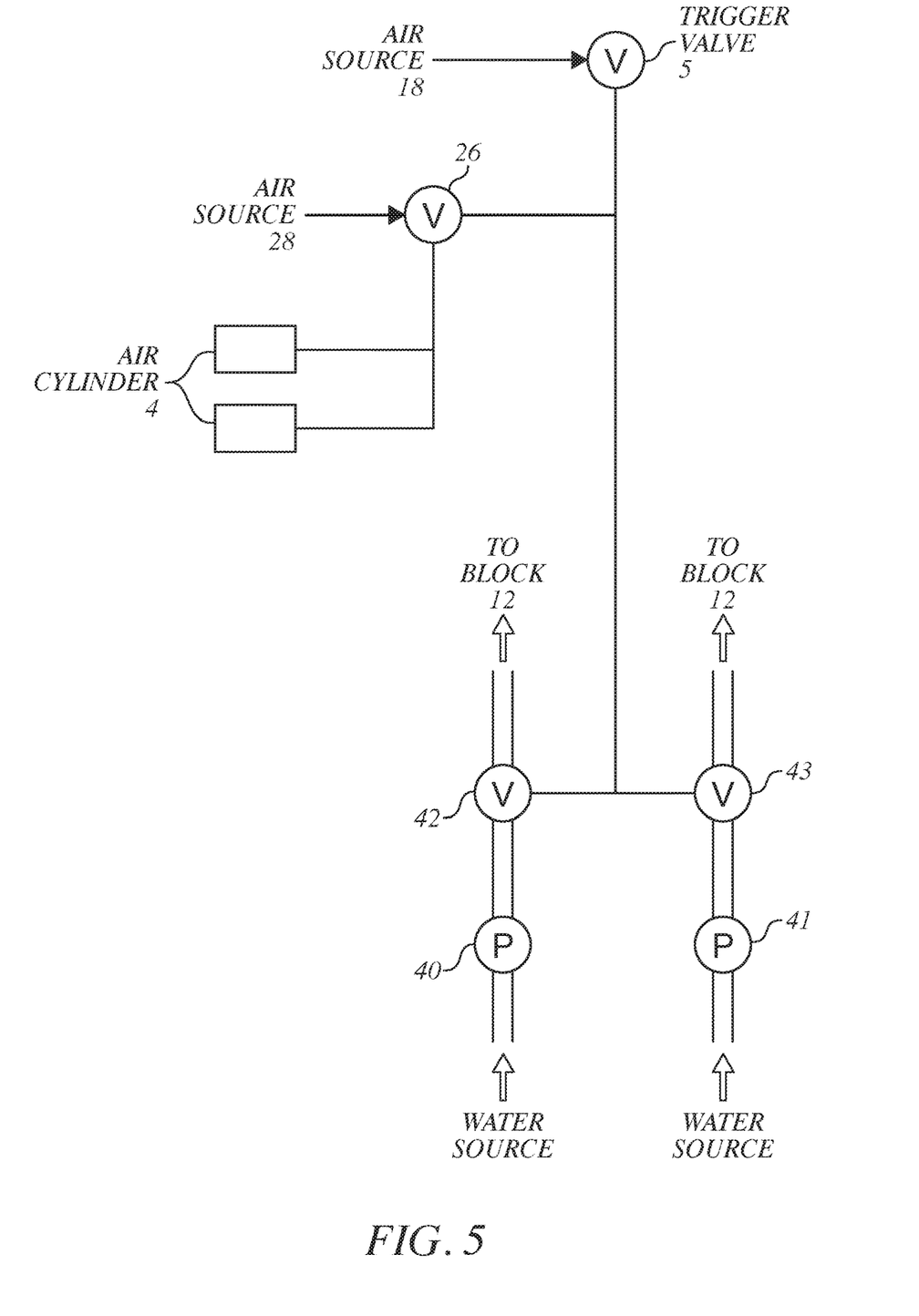
FIG. 5 is a system diagram of the invention for a paired set of guns.
Figure 6A:
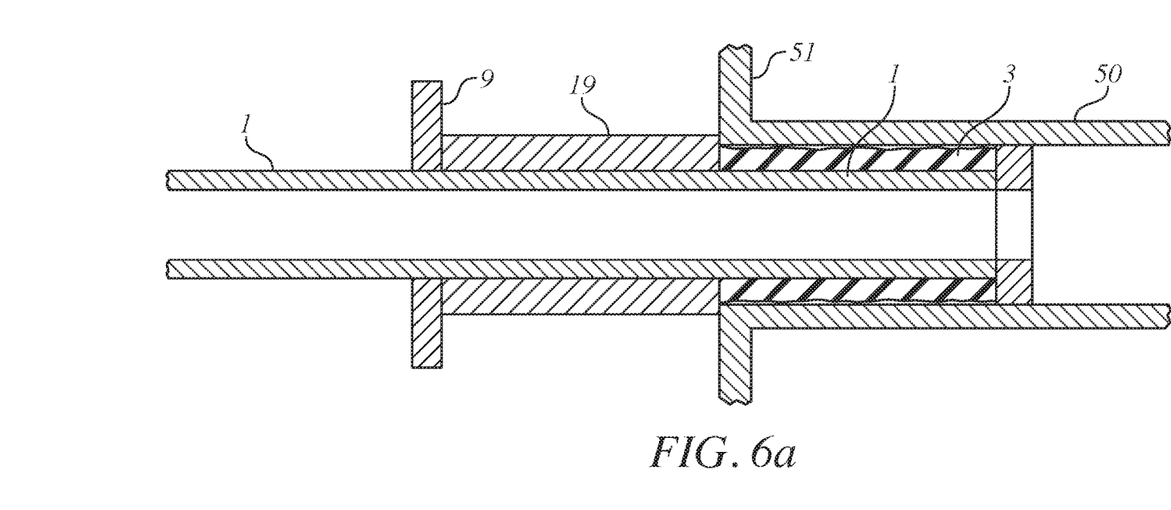
FIGS. 6a and 6b show the nozzle inserted into a tube before and after the trigger valve is actuated.
Figure 6B:
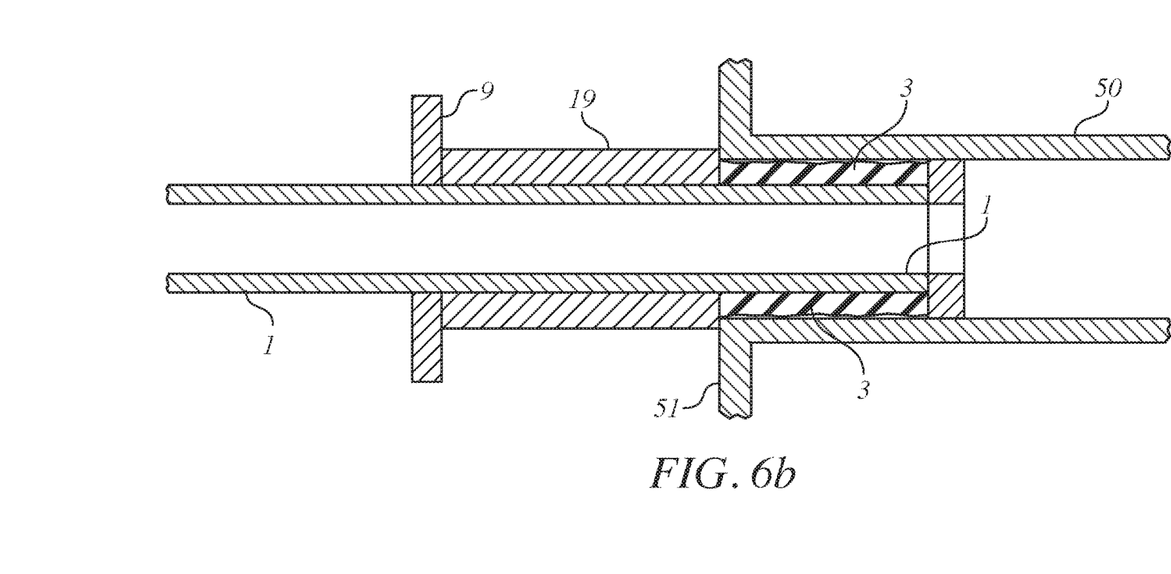

Referring first to FIG. 1, the water gun has a nozzle 1 for inserting into a heat exchanger tube (see FIGS. 6a and 6b). The nozzle 1 is tubular, has a terminal rim 2, and is covered by a flexible sleeve 3. At the opposite end of the gun, an air cylinder 4 is positioned to retract nozzle 1 a short distance (as will be explained further with respect to FIGS. 3a, 3b, 6a and 6b) after it is inserted into a heat exchanger tube, thus crimping sleeve 3 lengthwise and causing it to form a good seal within the tube by tightly contacting its interior surface. An air trigger valve 5 is mounted on the gun. When triggered, the valve 5 performs two functions: it admits pressurized air from source 18 to the cylinder air inlet 6, and, also using compressed air, it opens a water valve (see FIG. 5) to admit pressurized water into the water gun through fitting 7, passing it through the nozzle 1 and into the heat exchanger tube. A frame described more fully in FIGS. 2 and 3a maintains a rigid dimension between the cylinder 4 and the frame's front member 9. The operator may observe the water pressure indicated on meter 10 to note the progress of the procedure and especially to note when a projectile exits the distal end of the heat exchanger tube, thus greatly reducing the indicated water pressure. A vacuum breaker 11 protects against undesirable suction in the water line.

Figure 2:
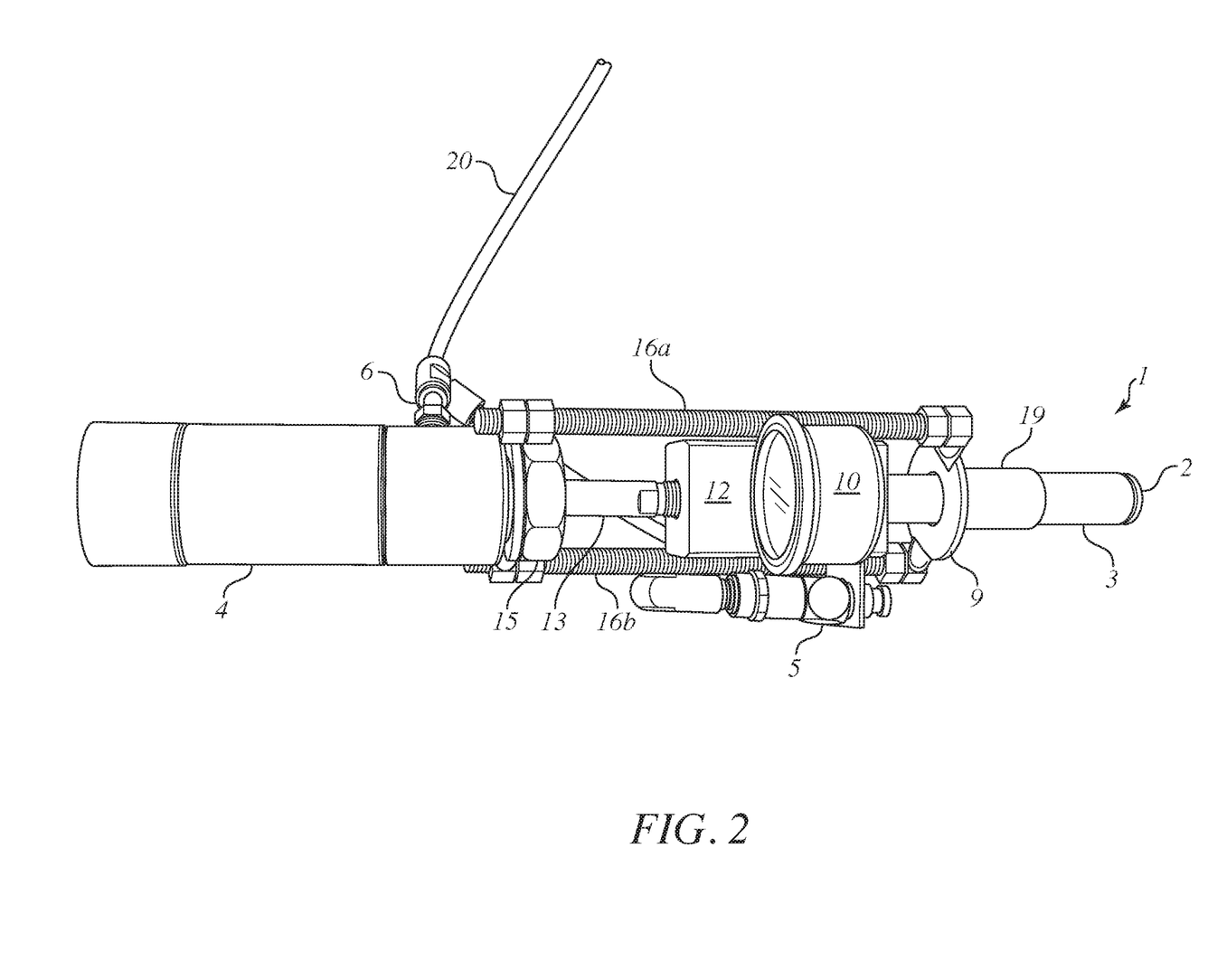
FIG. 2 is an overhead view of the water gun of FIG. 1.

In the overhead view of FIG. 2, the air inlet 6 to cylinder 4 is seen to be provided with an air hose 20, disconnected from its source in this view. Nozzle 1 terminates in rim 2 and is covered by flexible sleeve 3 and sliding mount 19. Water pressure meter 10 is on top of block 12. Piston 13 passes between block 12 and base 15 which together form a substantially rectangular framework including also front member 9 and connecting rods 16a and 16b. The air trigger valve 5 is on the lower side, as depicted.

Figure 3A:
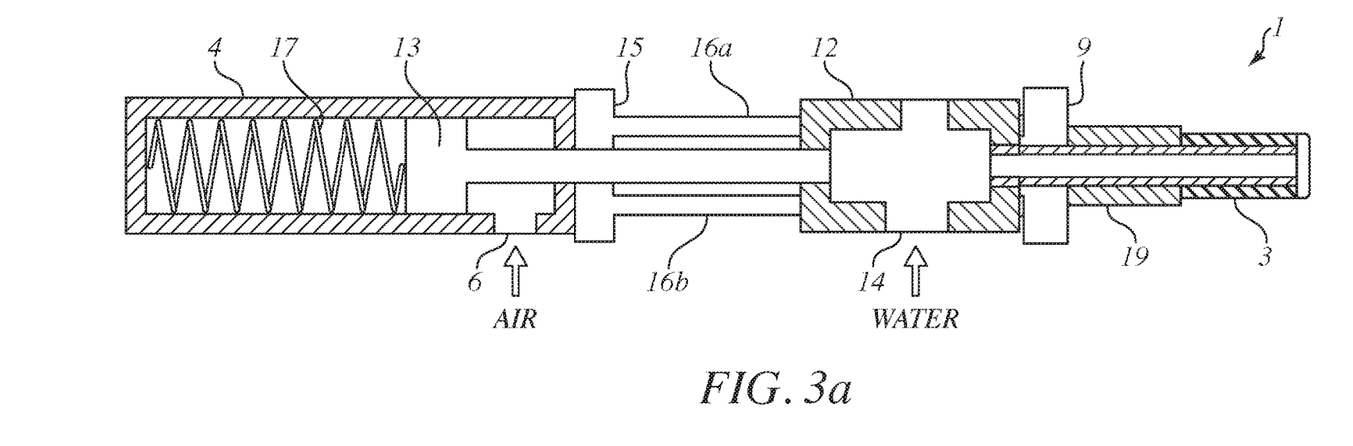
FIG. 3a is a simplified sectional view of the water gun of FIG. 1 prior to insertion into a heat exchanger tube.
Figure 3B:
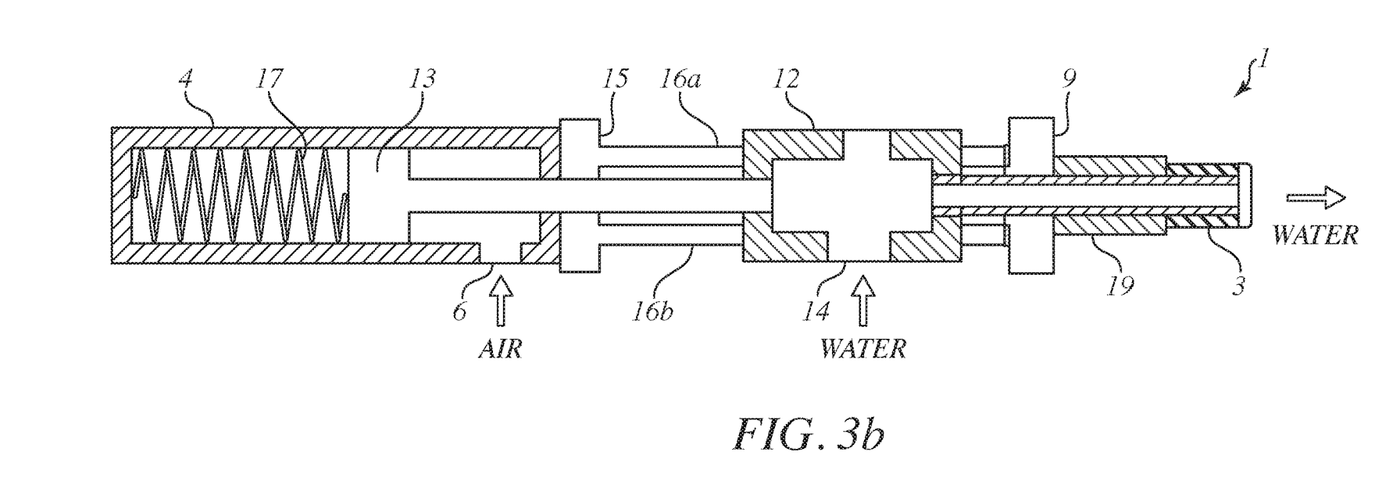
FIG. 3b is a simplified sectional view similar to FIG. 3a except that the trigger has been activated, causing movement of the piston, block and nozzle.

FIGS. 3a and 3b are simplified to show particularly the internal parts of the gun and its operation. Between the cylinder 4 at the left end, as depicted, and the nozzle 1 at the right end, is block 12. Piston 13 is threaded into block 12 on the left and nozzle 1 is threaded into the right end of block 12, which may be made of light weight metal such as aluminum. With the appropriate valve action, as will be further explained, water may enter block 12 through water inlet 14 and pass into and through nozzle 1. At the same time, compressed air enters cylinder 4 through air inlet 6, urging piston 13 to the left (as depicted), overcoming the tendency of spring 17 to move it to the right. This causes the connected block 12 and nozzle 1 to move to the left. A framework of base 15, rods 16a and 16b, and front member 9 creates a rigid unit through which the assembled piston 13, block 12, and nozzle 1 move leftward together.

FIG. 3b is similar to FIG. 3a except that the nozzle 1 has been inserted into a heat exchanger tube (see FIGS. 6a and 6b) into which has first been inserted a cleaning projectile, not shown. The heat exchanger tube is known to be ready for cleaning, and may be quite long. The operator has inserted the nozzle so that terminal rim 2 and the entire length of rubber sleeve 3 is within the tube.

When trigger valve 5 (see FIG. 1) is activated, air and water enter the gun separately, as also explained with reference to FIG. 5. High pressure water enters block 12 through inlet 14 and is directed to nozzle 1 and further into the tube to be cleaned as indicated by the arrows. Compressed air is sent through inlet 6 to cylinder 4, forcing piston 13 to the left, as depicted. Since piston 13 is connected to block 12, it also is urged to the left, bring nozzle 1 along with it. This is the status of FIG. 3b. As front member 9 remains a fixed distance from cylinder 4, and sliding mount 19 abuts sleeve 3, sleeve 3 is crimped and compressed lengthwise as nozzle 1 slides within front member 9. It should be observed that the evident length of sleeve 3 has been shortened the same distance that piston 13 and block 12 have been moved. On release of the air pressure and closing of the water valve (FIG. 5), the parts will return to the position of FIG. 3a.

Figure 4A:
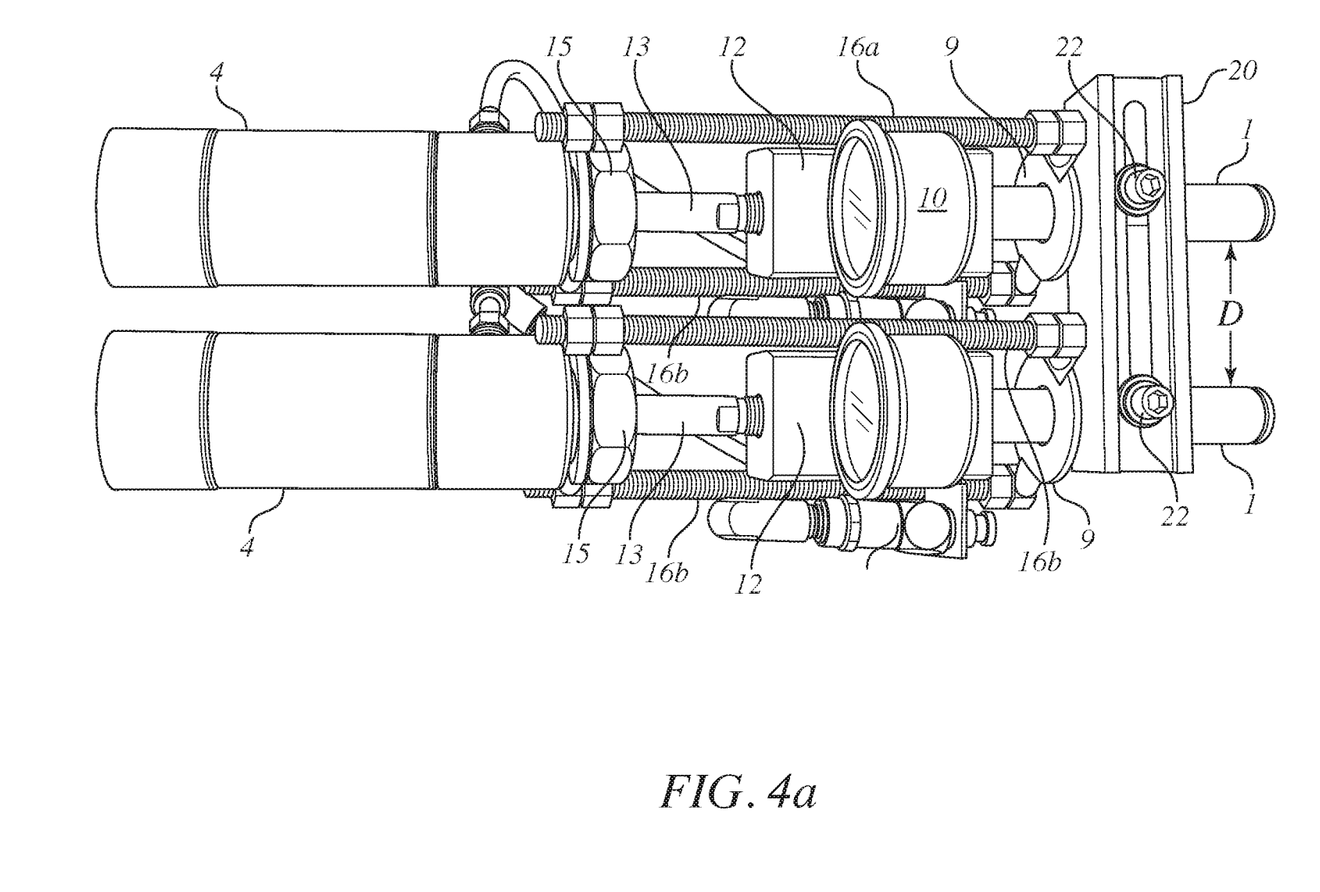
FIG. 4a is an overhead view of a water gun pair of the invention.

In FIG. 4a, two water guns as described in FIGS. 1, 2, 3a and 3b have been arranged into a pair that can be used simultaneously. Each of the two water guns has an air cylinder 4, a nozzle 1, piston 13, block 12, water pressure meter 10 and a framework of base 15, front member 9, and connecting rods 16a and 16b. A mounting bracket 20 spans the two nozzles and holds them together. The distance D between the two nozzles 1 is fixed by adjusting fasteners 22 on mounting bracket 20. It should be understood that the descriptions of paired guns herein are applicable to arrangements having three or more guns by lengthening mounting bracket 20 or modifying it into a triangular configuration, for example, so three or more guns can be mounted on it at the appropriate distances apart for a given heat exchanger. The reader may be interested also in the descriptions of two or more water guns in our copending patent application titled "Multi-Nozzle Mechanical Tube Cleaning System" Ser. No. 15/675,179 filed Aug. 11, 2017, which is hereby incorporated herein in its entirety. The water guns described in that application also utilize an adjustable bracket to hold the guns at a desired distance apart.

Figure 4B:
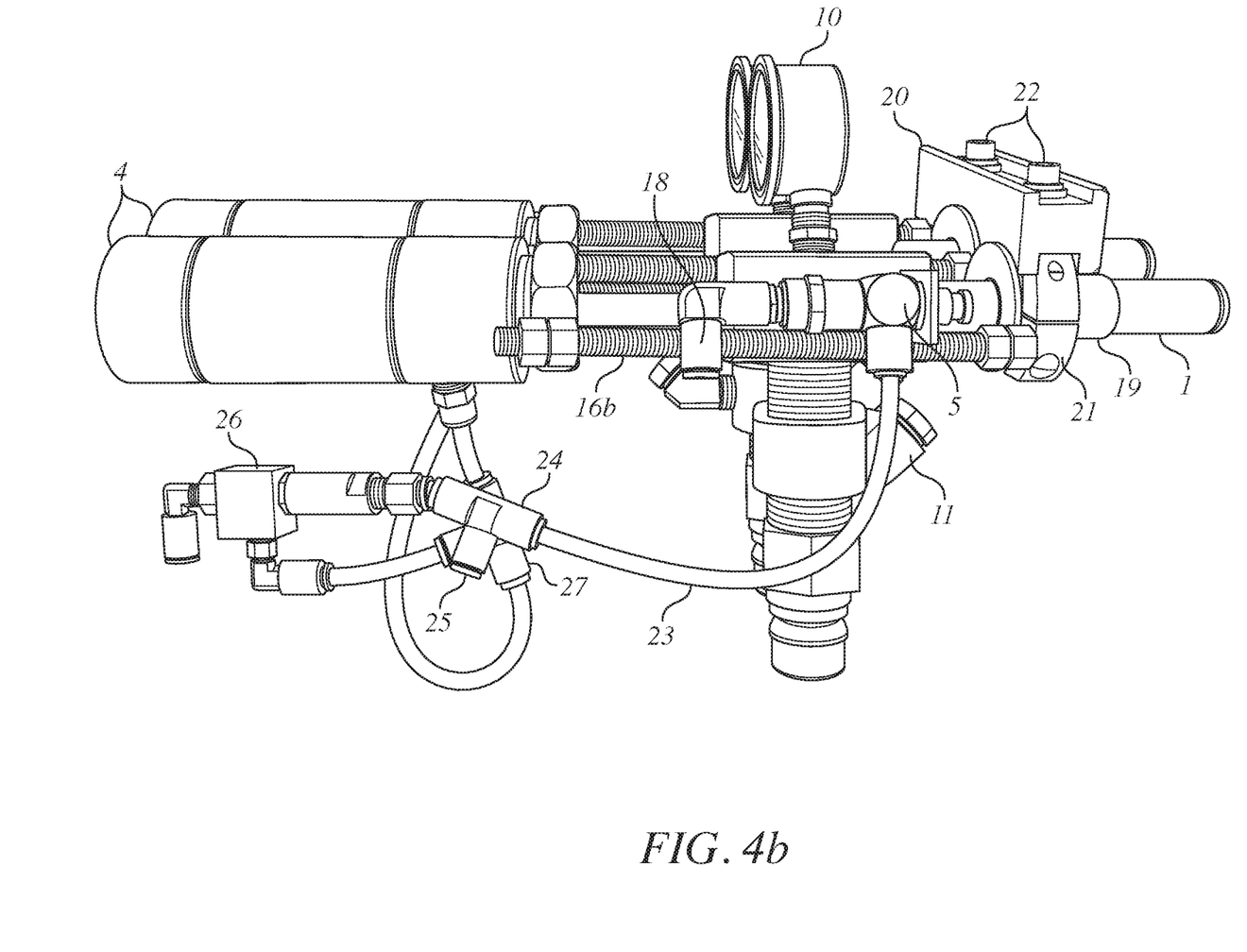
FIG. 4b is a side view of the same combination.

FIG. 4b shows the paired water guns of FIG. 4a from the side. The mounting bracket 20 is situated on mounting rings 21 which in turn are fastened to sliding mounts 19. As indicated respecting FIG. 4a, the distance between the substantially parallel nozzles 1 is adjustable by fasteners 22, which may be any suitable fasteners such as nuts. Trigger valve 5 is able to operate both guns at once. Operating trigger valve 5 releases compressed air from source 18 through T connection 24. T connection 24 has outlet 25 which connects to an air conduit (not shown in this view) to a water valve for each of the guns. Air passing through T connection 24 also opens air valve 26 which in turn leads to T connection 27 having connections to both air cylinders 4. Thus one motion by the operator to trigger valve 5 simultaneously causes pressurized water to flow into both nozzles 1 and also to retract both nozzles 1 as explained with respect to FIGS. 3a and 3b.

FIG. 5 is a simplified flow diagram of the pneumatic and hydraulic systems assembled to operate a paired set of water guns such as shown in FIGS. 4a and 4b. The two water guns are each served by their own pressurized water sources and pumps 40 and 41, and each has its own air-operated water valve 42 and 43. Water released by the water valves 42 and 43 is directed to blocks 12 of each of the two guns, not shown. The air-operated water valves 42 and 43 are opened simultaneously by trigger valve 5, which has a compressed air source 18. Pressing the trigger valve 5 also opens air valve 26, which has its own compressed air source 28. Air valve 26 immediately actuates both cylinders 4 on the guns. The two guns thus operate simultaneously, releasing high pressure water into the nozzles and tubes, and crimping the sleeves 3 on the nozzles, as described also in FIGS. 6a and 6b. It is to be understood that a third water valve on a third source of water could be added to the system; also a third air cylinder on a third gun could be activated. Three or more water guns assembled together could thus be operated by a single push of the trigger valve 5.

The water guns are handled manually, and a high degree of freedom of movement is needed in the environment of the heat exchanger so the operators can move quickly from one position on the face of the heat exchanger to another. Both the water conduits and the air tubes are therefore beneficially quite flexible, and it is expedient to maintain the heavier parts such as water valves 42 and 43 and pumps 40 and 41 in a separate, yet portable, container that can be placed on the floor or other nearby space convenient to the compressed air and pressurized water sources.

In FIG. 6a, nozzle 1 is shown inserted into tube 50, which recedes from the face 51 of a heat exchanger. The operator inserts the nozzle so that sliding mount 19 abuts heat exchanger face 51. At its other end, sliding mount 19 abuts front member 9. Flexible sleeve 3 surrounding nozzle 1 is still relaxed, not yet forming a complete seal with the internal surface of tube 50.

FIG. 6b shows the position of the nozzle 1 after trigger valve 5 (see FIG. 1) has been actuated. Nozzle 1 has been retracted by the action of air cylinder 4 and piston 13 as explained respecting FIG. 3b and elsewhere herein, and accordingly the distance nozzle 1 penetrates into tube 50 has been shortened, crimping and compressing sleeve 3 lengthwise, forcing it into close contact with the interior surface of tube 50. The seal is thus complete, requiring minimal effort by the operator. Because of the reduced exertion required and the excellence of the seal formed, we are able to combine two or more guns into a single device for cleaning two or more tubes at once. Moreover, we do not need a splash guard as is common with prior art devices.

The pneumatic control system may be replaced by an electric one; however, because water may occasionally find its way to the controls in spite of the invention, a pneumatic system is preferred for safety reasons. A wireless system, operated by a touch control in place of trigger valve 5, would require a tightly waterproof remote control. Nevertheless, electric controls for the valves are contemplated within our invention.

In describing the invention, we have consistently used the term "water" for the cleaning fluid, i.e. the fluid that propels the cleaning projectile. It should be understood that the apparatus and method function in the same way whether or not the liquid is water—for example, it may for some reason be called a cleaning solution or a purge, or it may carry dissolved or particulate matter and thus be called something other than "water," or it may be an organic solvent or an acid. For purposes of the operation of the invention, all such types of liquid are equivalent.

Likewise, we have described the invention as applicable to projectile tube cleaning—the process is which a scraping projectile is forced through a tube by hydraulic pressure. Our invention is applicable to any type of tube cleaning using high pressure liquid, where a good seal is needed, whether or not a projectile is propelled through the tube.

Thus, it is seen that our invention includes a method of making a temporary seal between a water gun nozzle inserted into a heat exchanger tube and the internal surface of the heat exchanger tube comprising crimping a flexible sleeve on the nozzle. We have illustrated the method with a rim on the end of the nozzle to retain the sleeve in place, but it should be understood that any suitable method of retaining the end of the sleeve in place, allowing it to be crimped without slipping off the nozzle, may be used. Our illustrations of the nozzle are substantially tubular—that is, of an apparent constant diameter—but the nozzle could be slightly tapered; we do not intend the term "tubular nozzle" to be limited to a constant internal or external diameter. Also, we use the terms "crimp" and "compress" interchangeably when describing the action of the gun to retract the nozzle and shorten the effective dimension of the sleeve to force it into tight contact with the inside of the tube. And, the term "flexible" is intended to include "elastomeric" and may be made of synthetic or natural rubber or any other suitably resilient material; any sleeve which is compressible or can be crimped to form an effectively tight seal is intended to be included in the invention.

Thus, our invention includes a method of making a temporary seal between a water gun nozzle inserted into a heat exchanger tube and the internal surface of the heat exchanger tube comprising crimping a flexible sleeve on the nozzle.

Our invention also includes a water gun for releasing high pressure water into a tube to be cleaned, the tube having a known internal diameter, the gun comprising (a) a tubular nozzle for directing water into the tube to be cleaned, the tubular nozzle having a terminal rim, (b) a flexible sleeve on the tubular nozzle, an end thereof abutting the terminal rim, the tubular nozzle with the flexible sleeve thereon having an external diameter dimensioned to fit within the tube to be cleaned, and (c) a piston for partially retracting the nozzle while inserted in the tube to compress the flexible sleeve and form a tight seal between said nozzle and the tube.

The invention claimed is:

1. A water gun for releasing high pressure water into a tube to be cleaned, said tube having a known internal diameter, said gun comprising (a) a tubular nozzle for directing water into said tube to be cleaned, said tubular nozzle having a terminal rim, (b) a flexible sleeve on said tubular nozzle, an end thereof abutting said terminal rim, said tubular nozzle with said flexible sleeve thereon having an external diameter dimensioned to fit within said tube to be cleaned, (d) a piston for partially retracting said nozzle while inserted in said tube to compress said flexible sleeve and form a tight seal between said nozzle and said tube, and (e) a trigger for releasing pressurized water into said tubular nozzle, wherein said trigger also pneumatically moves said piston.

2. The gun of claim 1 held on a bracket with at least one additional gun of claim 1.

3. The gun of claim 1 wherein said flexible sleeve is made of synthetic or natural rubber.

4. The gun of claim 1 including (a) a conduit for directing pressurized water to said nozzle and (b) a conduit for compressed air for moving said piston.

5. The gun of claim 4 wherein said conduits (a) and (b) are flexible.

6. The gun of claim 1 including (a) a pneumatic cylinder (b) a spring within said cylinder for urging said piston to extend said nozzle and (c) an air inlet for introducing pressurized air to urge said piston to compress said flexible sleeve.

7. The gun of claim 1 including a sliding mount abutting said flexible sleeve and a front member.

* * * * *